Dec. 29, 1931.   H. F. FISHER   1,838,379
METHOD OF INVERTING THE PHASE OF EMULSIONS
Filed Oct. 12, 1927
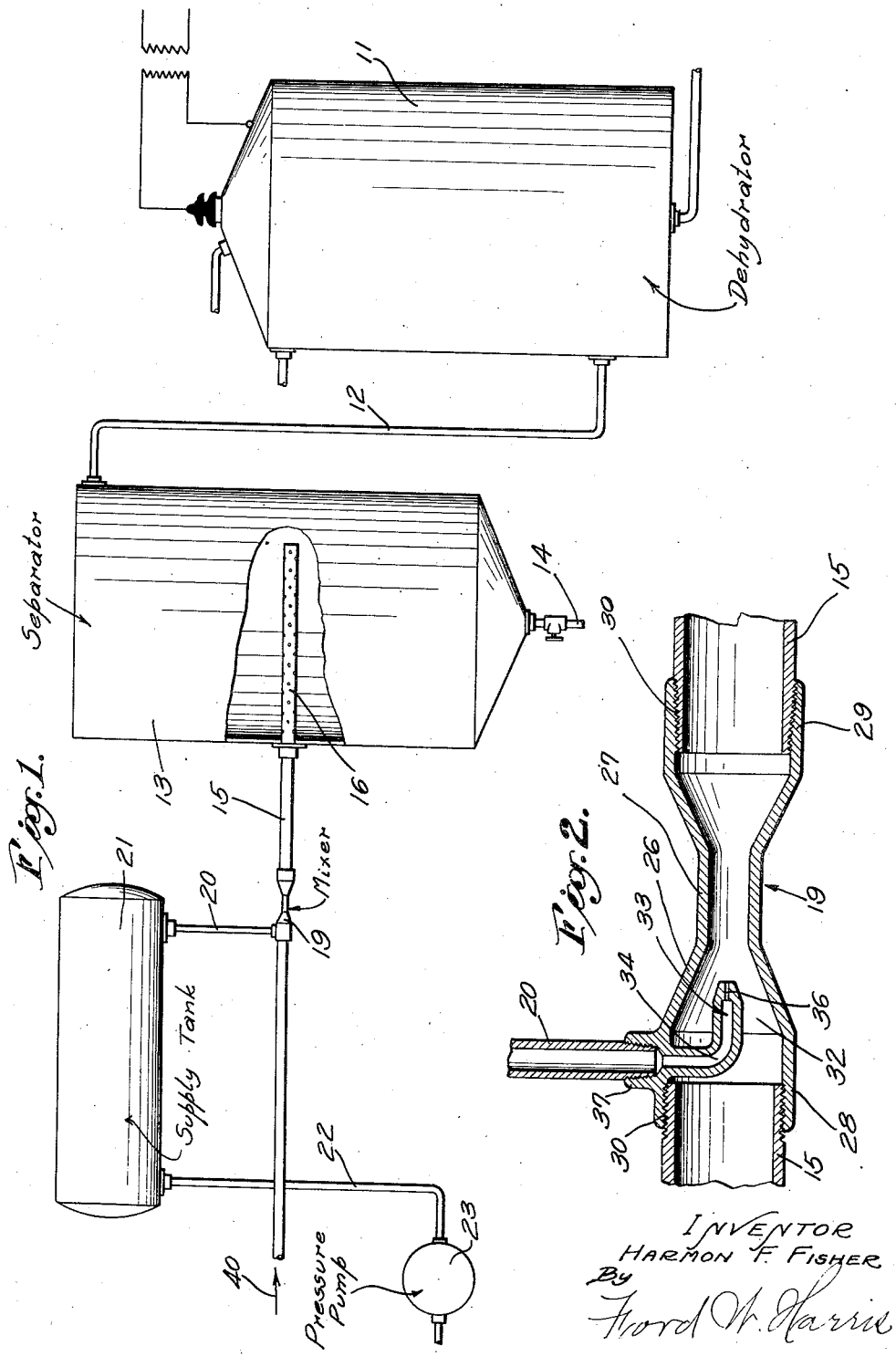
INVENTOR
HARMON F. FISHER
By
Ford W. Harris
ATTORNEY Patented Dec. 29, 1931

1,838,379

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF INVERTING THE PHASE OF EMULSIONS

Application filed October 12, 1927. Serial No. 225,647.

My invention relates to emulsions and more particularly to a method of inverting the phase of an emulsion and subsequent electrical treatment.

Every emulsion has at least two liquid phases. That liquid which is broken up into small globules is termed the dispersed phase, while that liquid which surrounds these globules is termed the continuous phase. Ordinarily, the two liquids are immiscible, or very nearly so.

Given two such liquids A and B, and a suitable third substance as an emulsifying agent, two emulsions are possible. The first will have A as the dispersed phase and B as the continuous phase, while the second will have A as the continuous phase and B as the dispersed phase. For example, oil and water will give a water-in-oil emulsion with a calcium or magnesium soap, or can be made to form an oil-in-water emulsion with a sodium soap. By adding an excess of a sodium soap to a water-in-oil emulsion, the latter is inverted to an oil-in-water type, and, vice versa, by adding an excess of a calcium or magnesium soap to an oil-in-water emulsion, the latter is converted to a water-in-oil emulsion. For the purpose of illustration, these terms will be used throughout this specification, but it should be understood that my invention is applicable to other mediums besides oil and water or to other emulsifying agents than those mentioned. Furthermore, I shall describe my invention with respect to the petroleum industry without limiting myself thereto.

Emulsions of the water-in-oil type, where the water is the dispersed phase, can be broken down with comparative ease by passing the emulsion through an electric field, usually of high potential gradient. On the other hand, oil-in-water emulsions cannot be broken down by ordinary methods. Ordinary mechanical methods other than filtration fail, due to the smallness of the globules, and the usual high potential electrical methods fail, due to the oil-in-water emulsion being a relatively good conductor which precludes the establishing of a high potential field therein.

It is an object of my invention to provide a method of breaking emulsions of the oil-in-water type.

I have found that it is possible to invert the phase of such an emulsion. Thus, by my method it is possible to change an oil-in-water emulsion into a water-in-oil emulsion which can be easily broken down by well known methods.

It is an object of my invention to provide a method of inverting the phase of an emulsion.

A further object of my invention is to provide a method of breaking an oil-in-water emulsion by first inverting the phases, making a water-in-oil emulsion, and subsequently breaking the latter emulsion.

Petroleum, as it is taken from the wells, usually has water associated therewith. Basically this is a water-in-oil emulsion which can be easily broken down by passing it through an electrical treater. Many times, however, the emulsion carries finely divided particles of foreign matter, usually a finely divided silica or quartz. These finely divided particles act as an emulsifying agent to form an oil-in-water emulsion which cannot be broken down by electrical means. In such a substance there is a mixture of both types of emulsion. If subjected to the action of an electrical treater, such an emulsion mixture containing this foreign matter will separate into a dry oil, water, and an oil-in-water emulsion. I have found that if this oil-in-water emulsion is treated with a solution of the salts, preferably of a strong base and a weak acid such as sodium carbonate, the foreign matter will separate from the emulsion and drop with a portion of the water, while on top will be a water-in-oil emulsion which may be easily dehydrated by electrical methods. Similarly, if the emulsion, as it comes from the well containing an oil-in-water emulsion, is subjected directly to the action of the solution of salts, the oil-in-water emulsion will be inverted into a water-in-oil emulsion which can be easily dehydrated.

It is an object of my invention to invert the phase of an emulsion by the addition thereto of a solution of the salts of a strong base and a weak acid, or other suitable inverting agents.

Further objects and advantages will be made evident hereinafter.

Referring to the drawings, which are for illustrative purposes only,—

Fig. 1 is a diagrammatic view illustrating a complete apparatus for carrying on the invention.

Fig. 2 is an enlarged fragmentary section of a mixer which is of particular value in conducting the method of the invention.

Referring to Fig. 1 of the drawings, the numeral 11 represents a dehydrator having an emulsion inlet 12. The emulsion inlet 12 is connected to the lower part of the dehydrator 11 and is also connected to the upper part of a separator 13. The separator 13 is provided in the form of a tank, the lower end of which is conical and provided with a foreign matter outlet 14. Connected to the central part of the separator 13 is an emulsion inlet 15. The emulsion inlet 15 has a distributor pipe 16 connected thereto, this distributor pipe 16 being located in the separator 13. The emulsion inlet 15 may extend directly from the well or may extend from emulsion storage tanks. A mixer, indicated at 19, is included in the emulsion inlet 15 near the separator 13. Connected to the mixer 19 is a treating solution supply pipe 20 which is extended from a supply tank 21. The solution is pumped into the supply tank 21 through a pipe 22 by means of a pump 23.

Referring to Fig. 2 of the drawings, the mixer 19 has a shell 26 having a central neck 27 and end portions 28 and 29 which are substantially the same size as the emulsion inlet 15. The ends of the end portions 28 and 29 are threaded as indicated at 30 for receiving ends of pipe which form the emulsion inlet 15. Extended into a chamber 32 provided by the portion 28 is a nozzle 33 having a passage 34 formed therein. The inner end of the nozzle 33 extends in a direction towards the separator 13 and is located substantially on the axis of the mixer 19 and of the emulsion inlet 15.

The extreme inner end of the nozzle 33 is provided with a small jet opening 36. The end of the pipe 20 is threadedly secured in a projection 37 of the shell 26, the passage thereof being in communication with the passage 34 of the nozzle 33.

The operation of the invention is substantially as follows:

Emulsion to be treated passes through the emulsion inlet 15 in a direction indicated by the arrow 40 of Fig. 1. This emulsion is of a type which cannot be treated readily or economically by an electrical dehydrator to separate the phases thereof. The emulsion carries particles of foreign matter which form an oil-in-water emulsion. The pump 23 supplies the treating fluid to the supply tank 21. I find a solution of salts, preferably those of a strong base and a weak acid, to be particularly effective. Such a salt is $Na_2CO_3$, which is sodium carbonate. The pressure in the supply tank is preferably around 250 pounds per square inch, although I do not limit myself thereto as this pressure may be varied without departing from the spirit of the invention.

The solution of salts is injected under this high pressure into the emulsion flowing through the mixer 19. It will be seen that the size of the nozzle 33 is comparatively small so that only a small volume of treating fluid will be used. This small volume of treating fluid, however, is under a high pressure so that a pronounced jet pump effect is obtained. The oil is rapidly moved by this action, and the supplying or jetting action is also effective in providing a very satisfactory mixture of the emulsion and the treating fluid. The mixture of the emulsion and the treating fluid passes into the separator 13 through the spray pipe 16.

The oil-in-water emulsion, when treated with the treating fluid, is changed into a water-in-oil emulsion which rises to the top of the separator 13. The foreign solid particles in the emulsion originally supplied to the pipe 15 gravitate to the bottom of the separator, together with a small amount of water. These foreign particles and this small amount of water may be removed at intervals from the bottom of the separator 13 through the outlet 14. The water-in-oil emulsion in the top of the separator 13 is conducted through the pipe 12 to the electrical dehydrator 11, where it is subjected to the action of an electric field having a high potential gradient.

The separation of the foreign matter from the emulsion is comparatively rapid in the separator 13, although these foreign particles would not separate from the emulsion originally supplied to the pipe 15 without the use of a suitable treating fluid. Very little, if any, dehydrating action takes place in the separator 13. The function of this separator is to separate the free, treating solution and some foreign matter from the inverted phase of the emulsion so that subsequent treatment in an electrical dehydrator is made possible. The emulsion originally supplied through the pipe 15 is one which could not be directly dehydrated in the dehydrator 11, inasmuch as it is an oil-in-water emulsion which would short circuit the electrodes of the dehydrator 11.

While I have particularly described my invention as applicable to the petroleum industry, it should be understood that the method of my invention may be applied to various other emulsions in which it is desirable to invert the phases thereof. Furthermore, my invention should not be limited to the specific salts mentioned as there are numerous substances which might be used to accomplish the same result.

I claim as my invention:

1. A method of separating the phases of an emulsion of the oil-in-water type and which is not susceptible to conventional electrical dehydrating methods, which includes the steps of: mixing with said emulsion of the oil-in-water type a chemical capable of and in sufficient quantities to reverse the type of said emulsion in a manner to form an emulsion of the water-in-oil type; separating the water-in-oil emulsion from the residual matter; and subjecting the remaining emulsion of the water-in-oil type to the action of a high potential electric field.

2. A method of separating the phases of an emulsion of the oil-in-water type and which is not susceptible to conventional electrical dehydrating methods, which includes the steps of: forming a moving stream of said emulsion of the oil-in-water type; forcing into said moving stream of emulsion a chemical agent capable of changing said emulsion to one of the water-in-oil type; controlling the amount of said chemical agent introduced to effect a substantially complete reversal of said emulsion into one of the water-in-oil type; subjecting said emulsion of the water-in-oil type to the action of a high potential electric field to agglomerate the water phase thereof; and separating said agglomerated water phase from the oil phase.

In testimony whereof, I have hereunto set my hand at Los Angeles, California, this 6th day of October, 1927.

HARMON F. FISHER.